United States Patent Office 3,083,136
Patented Mar. 26, 1963

3,083,136
PROCESS FOR THE EXTRACTION OF PYRETHRINS FROM PYRETHRUM FLOWERS
Luis W. Levy, 1237 Orellana Ave., Quito, Ecuador
No Drawing. Filed Feb. 26, 1962, Ser. No. 175,789
7 Claims. (Cl. 167—24)

This invention relates to a process of producing insecticides and especially to a process of producing a pyrethrin extract from fresh pyrethrum flowers utilizing an improved mixed solvent. This extract so produced is different in certain respects and superior to those produced by conventional methods.

This application is a continuation-in-part of my co-pending application Serial No. 811,001, filed May 5, 1959, now abandoned.

The insecticidal value of pyrethrum flowers has been known for centuries. Whereas their use originally was in the form of powder, present usage is very largely in the form of extracts containing the so-called active principles in liquid form, and in varying degrees of concentration and purity. Modern usage demands extracts containing high concentration of active principles and substantially free from natural impurities which inevitably are extracted from the flowers along with the active principles.

Four active principles of the pyrethrum flowers, known as pyrethrins, have been isolated and identified, and the structural formulas determined. These are Pyrethrin I and Cinerin I, and Pyrethrin II and Cinerin II. Methods are now available by which these can be determined separately and individually. However, the value of pyrethrum flowers and pyrethrum extract is customarily based on the percentage content of total pyrethrins as determined by chemical methods.

Conventional procedures for handling pyrethrum flowers have involved (a) Drying
(b) Baling (under varying degrees of pressure)
(c) Shipment to the extract plant
(d) Grinding for extraction
(e) Extraction
(f) Concentration and purification of the extract In the customary language of the trade, "pyrethrum flowers" do not refer to the fresh flowers containing their natural moisture but refer to the dried flowers containing less than 10% by weight of moisture. Hereafter I will use the term "dried flowers" to designate the above.

Commercially complete extraction of ground dried flowers can be obtained in various types of equipment and using a wide range of solvents including organic solvents, such as alcohol, acetone, benzol, chlorinated hydrocarbons, etc., and hydrocarbon oils such as petroleum ether, hexane, solvent naphtha and kerosene. Theoretically any solvent which dissolves the readily oil-soluble pyrethrins can be used. Practical commercial usage in recent years has centered on low-boiling hydrocarbon solvents, such as hexane, for two reasons. First, such a solvent, which should be free from naphthenic and unsaturated hydrocarbons, is selective to a degree and will extract the pyrethrins without removing too high a percentage of other natural constituents, such as coloring matter, fats, waxes, etc., the presence of which would complicate the subsequent purification procedures. Second, such a solvent, being volatile at reasonable temperatures, facilitates the removal procedure which is essential to concentration.

The pyrethrins present in the extract are unstable at higher temperatures and prolonged heating above 60° C. results in some destruction of the biological activity of the pyrethrins. It is therefore advisable to utilize a solvent boiling at about 60° C. or below for an extractant, although higher boiling solvents can be used if a vacuum still is employed in the concentration step.

It has long been recognized that pyrethrin content is at a maximum in freshly picked flowers and that they may contain other biologically active and valuable constituents, the existence of which has been suspected but not proven, and which are lost in conventional procedures of handling. It is recognized that there is a substantial and economically important discrepancy between the pyrethrins which are present in the flowers at the time of picking and the portion of these pyrethrins which is converted into finished extract by conventional procedures. Losses occur in drying, in baling, in shipment, in storage, in grinding and in extraction. Further losses occur in concentration and purification of the extract, and these losses are substantially higher if the crude extract contains a large proportion of natural impurities or if the impurities are of a nature which makes them difficult to remove.

The importance of the losses in drying has been recognized, and it has been demonstrated that improved drying techniques such as those involving quick drying at controlled temperatures and high vacuum reduce these losses. Unfortunately these techniques are expensive and difficult to apply, involving capital expenditures and technical skill. The losses in baling, shipping and storage can be overcome by locating the extraction plant close to the growing area. By all these expedients, however, it is impossible to obtain all of the biologically-active material present in the freshly picked flowers.

The losses in value which occur in the various stages of conventional handling and processing cannot be determined accurately or completely by present official methods of analysis. Pyrethrins are subject to various changes such as oxidation, hydrolysis, saponification, polymerization, and under certain conditions isomerization, which change the valuable pyrethrins into biologically inactive products. Some of the products formed by these changes respond to the reactions used in analytical procedures and consequently are calculated as pyrethrins. Consequently important discrepancies may exist between the chemical analysis and the biological activity. For example two extracts, both of which show equal pyrethrin content in chemical analysis by official methods, may have markedly different biological activity and consequently materially vary in value. Chromatographic procedures now developed but not yet officially accepted appear to determine so-called real pyrethrins as distinguished from total pyrethrins, and extracts made by different procedures may show marked differences when examined by chromatographic methods. Two points are not definitely determinable at present. There may be valuable biological constituents not yet recognized because they are lost in conventional processing methods. A further possibility is that any of the four pyrethrins may undergo isomerization or transposition with consequent reduction in eventual biological activity.

Obviously the ideal economic procedure would be one by which the pyrethrins and any other biologically valuable ingredients present in fresh flowers can be converted into concentrated, purified and colorless or practically colorless extract without loss of pyrethrin content or loss of biological activity, and at a reasonable economic cost. Procedures currently in use do not accomplish this.

The theoretical advantages of extracting fresh flowers have long been recognized. Numerous procedures have been attempted, none of which have been adaptable to commercial use and none of which have been employed except on a laboratory scale. The main difficulty arises from the fact that fresh flowers contain approximately 78% moisture. Water-miscible organic solvents are entirely impractical because of the problems of solvent recovery and the commercial impracticability of recovering the pyrethrins in sufficiently pure form from the crude extract without serious losses. Water-immiscible solvents such as the chlorinated hydrocarbons are subject to even more and greater practical disadvantages.

The use of hydrocarbon solvents such as petroleum ether, hexane, etc., has been known for many years, but no practical usefulness has developed. The main difficulty is apparently the poor transfer of the pyrethrins from the water phase of the flowers to the water-immiscible solvent phase.

In the British patent specification No. 596,187 there is described a process of extracting fresh pyrethrum flowers without previous drying by the use of a hydrocarbon solvent such as kerosene or petroleum ether that is immiscible in water. Such a method requires lengthy periods of extraction (i.e. 48 hours at 54° C.) and separation of oil and water phases, both drawbacks to economical processing.

I have discovered that by the use of certain types of mixed solvents it is possible and economically feasible to extract fresh undried or partially dried flowers simply, easily and quickly. This method not only extracts the active ingredients present in the fresh flowers but does so without removing an embarrassing amount of other natural constituents which cause difficulties in purification. By the use of my mixed solvents I obtain a substantially higher return of pyrethrins per ton of flowers than is commonly obtained by other procedures.

An object of the invention is to obtain quickly and easily with commercial equipment a highly toxic extract of fresh, undried pyrethrum flowers, which extract is readily purified and concentrated.

Another object of the invention is to extract fresh pyrethrum flowers having a moisture content above 30% with a mixed water-miscible, water-immiscible solvent under conditions whereby practically all the moisture remains in the flowers and is not extracted, whereas the pyrethrins are extracted.

An additional object of the invention is to obtain an acetone-hydrocarbon oil extract of pyrethrins from fresh pyrethrum flowers with a moisture content of 30% or more having superior biological power to the pyrethrum extracts now produced.

Various other objects and advantages of my invention will appear as this description proceeds.

I have discovered that by a suitable combination of water-miscible and water-immiscible solvents, such as, for example, 15% acetone and 85% petroleum ether, it is possible to extract the active ingredients from fresh pyrethrum flowers having a moisture content of 30% or more easily and completely without substantial removal of water, and at the same time remove only an abnormally low proportion of the fats, waxes and other impurities. This is surprising and unexpected since acetone is a relatively nonselective solvent and would be expected to substantially increase the amount of impurities extracted.

While I am not certain of the exact mechanism by which my mixture of solvents acts, I believe that the water-miscible solvent present in my mixed solvents penetrates the cells in which the pyrethrins are present quickly and completely, dissolves the pyrethrins and transfers them into the hydrocarbon phase without disturbing the water phase and leaving practically all the water present in the flowers.

The term "fresh pyrethrum flowers" used in the foregoing and hereinafter is not intended to imply that the flowers must be processed immediately after picking. On the contrary, they may be stored several days under suitable conditions. I am well aware that up to a point a certain amount of fermentation is not harmful and may indeed be beneficial in facilitating rapid extraction.

In addition, while the fresh pyrethrum flowers have a natural moisture content of approximately 78%, this value decreases through natural drying during the steps of picking and transporting for processing. The average value for moisture in the flowers during processing varies from about 55% to about 70% depending upon conditions after the flowers have been harvested.

I have found that even after some partial drying caused by exposure to the sun, the beneficial results of my process are obtained as long as the fresh pyrethrum flowers have a moisture content of 30% or more.

The commercial advantages of this process are several in number and vitally important.

(1) While the whole flower can be extracted without subdivision, it is preferable to effect some subdivision of the flower in order to more efficiently extract the pyrethrins. The subdivision need not be to the extent that moisture from the flowers will be liberated and interfere with the extraction. I have found that an optimum subdivision of the flowers is obtained by subjecting them to a shearing action of rapidly rotating blades, giving a coarsely divided material about $\frac{1}{64}$ to $\frac{4}{64}$ of an inch in the largest dimension. This coarsely divided material drains quickly and completely, thereby speeding up the process of extraction, increasing the capacity of the extraction unit, and minimizing solvent losses.

(2) The continuing presence of the water phase in the flowers apparently partially inhibits the ability of the hydrocarbon solvent to dissolve undesirable constituents from the flowers, while at the same time the presence of the large proportion of hydrocarbon partially inhibits the solution power of the acetone for constituents other than pyrethrins. The result is a crude extract unusually free from undesirable impurities and consequently simple to purify without loss.

(3) Because the pyrethrum flowers have not been subjected to procedures such as drying, grinding, etc., the crude extract obtained by this process has maximum biological activity.

(4) The relative freedom of the crude extract from difficult impurities simplifies the problem of carrying this maximum biological activity into a complete and highly purified extract.

(5) Reference to maximum biological value under 3 and 4 above is to be interpreted as meaning that pyrethrum extracts made by this process from fresh or partially dried flowers containing at least 30% or more of moisture have biological values substantially and significantly higher in relation to their chemical analysis than have conventionally prepared extracts. Since the value of a pyrethrum extract rests on its biological values, that is, its ability to kill insects, rather than on its ostensible pyrethrin content as determined by chemical analysis, this is of vital importance.

The preferable water-miscible solvent is acetone. Other water-miscible solvents which are also miscible in hydrocarbon solvents, such as dioxane, may also be used. The non-polar solvent is preferably an alkane, i.e., a hydrocarbon solvent relatively free from naphthenic constituents and unsaturated hydrocarbons. Such solvents as petroleum ether, hexane, heptane, solvent naphtha and kerosene may be used.

The practical limits other than cost and availability are that the boiling points of the solvents employed be sufficiently low to facilitate solvent recovery and concentration of the extract. Since the pyrethrins are relatively less stable at higher temperatures, it is preferable to concentrate at a temperature below 60° C. and the solvents must be selected with this in mind.

The proportions in which the two solvents may be used can vary within reasonable limits ranging, for example, from as little as 5% of water-miscible solvent and 95% of hydrocarbon up to 35% or 40% water-miscible solvent and 65% or 60% hydrocarbon. From a practical point of view acetone and a relatively low-boiling hydrocarbon such as petroleum ether, hexane, or low-boiling solvent naphtha seems ideal. There is a recognized advantage in using a hydrocarbon solvent relatively free from naphthenic constituents and unsaturated hydrocarbons because these constituents tend to increase the solvency power for unwanted materials. Equally few other solvents match acetone in cost, availability and adaptability to this procedure.

Wide variation in the ratio of acetone and hydrocarbon is possible, but experience has indicated that a 15–85 ratio is close to ideal. The use of lower proportions of acetone slows down the rate of extraction with consequent loss of equipment capacity, while the use of acetone in excess of 15% does not appear to increase the speed of extraction and increases undesirable complications.

TABLE I

*Extent of Extraction as a Function of Acetone Content of Mixed Solvent*

| Percent Acetone In Solvent | Moisture of Flowers, Percent | Time Allowed For Extraction, hrs. | Percent Pyrethrins Extracted (Calcd. on Dry Weight) |
|---|---|---|---|
| 0 | 63.7 | 17 | 0.98 |
| 5 | 74.4 | 28 | 1.23 |
| 10 | 73.9 | 14 | 1.39 |
|  | 74.4 | 28 | 1.62 |
| 15 | 73.9 | 14 | 1.83 |
|  | 74.4 | 28 | 1.86 |
| 20 | 73.9 | 14 | 1.89 |

The hydrocarbon solvent is petroleum ether. The extraction was carried out in a Soxhlet apparatus at room temperature.

Table I demonstrates that as the amount of acetone present is increased, a more rapid extraction of pyrethrins occurs up to a point where 15% acetone is present. This more rapid extraction is of economical importance and as shown in Table II, the use of a 15% acetone-85% petroleum ether extractant under given conditions results in complete extraction of the pyrethrins in 6 hours or under.

TABLE II

*Extent of Extraction After Different Times, Using a Mixed Solvent Containing 15% Acetone*

| Time Allowed For Extraction, hrs. | Moisture of Flowers, Percent | Percent Pyrethrins Extracted (Calcd. on Dry Weight of Flowers) |
|---|---|---|
| 3 | 69.4 | 1.18 |
| 6 | 68.7 | 1.98 |
| 14 | 73.9 | 1.83 constant |
| 28 | 74.4 | 1.86 |

The hydrocarbon solvent is petroleum ether. The extraction was carried out in a Soxhlet apparatus at room temperature.

It is apparent that by the process of the invention utilizing the mixed water-miscible, water-immiscible solvent in proper portions, extraction times are decreased markedly and higher yields of pyrethrins are obtained. My process makes it commercially feasible to process fresh pyrethrum flowers before the maximum biological value has been impaired. (Pyrethrum flowers vary greatly in pyrethrin content according to strain, area elevation, etc., from well below 1% pyrethrins (dry weight basis) to above 2%.) To illustrate its advantages and the losses inherent in conventional procedures, I base the following figures on so-called high test flowers as grown commercially in Africa and Ecuador and having a pyrethrin content of 1.75% (dry weight basis) after conventional drying.

Such flowers extracted by conventional methods near the point of origin and without being subjected to high pressure baling or prolonged storage might yield 35 lbs. of pyrethrins from each dry weight metric ton.

These same flowers after baling, shipping, storage and grinding might yield less than 30 lbs. and perhaps as little as 25 lbs. per dry weight metric ton.

By my process the yield per metric ton, calculated on a dry weight basis, might be expected to approximate or exceed 40 lbs. of pyrethrins.

Because of the high value of pyrethrins, an improvement in yield of one pound per metric ton of pyrethrins or less is economically significant.

The following examples are inserted to show the mode of operation of the invention. They are not intended, however, to act as a limitation upon the practice of the invention.

EXAMPLE I

An amount of 10.4744 gms. of fresh pyrethrum flowers, coarsely divided by subjecting the flowers to the action of a food blender, with a moisture content of 68.7%, was extracted for 6 hours in a Soxhlet apparatus, using as a solvent a mixture of 15% acetone and 85% petroleum ether. The extraction was carried out at 40° C. After the extraction time mentioned the extract was diluted to 100 ml. volume with petroleum ether. Only a few drops of water were carried down by the solvent and the solvent almost completely drained from the flowers. A 5 ml. aliquot was transferred to a small volumetric flask, about 2 ml. of kerosene was added, and the volatile solvent was evaporated in a vacuum of about 0.1 mm. for 5 minutes. The resulting solution was diluted to exactly 5 ml. volume and aliquots of 1 ml. each were taken for analysis by the "sulfur color" method (Levy and Estrada, Journal of Agricultural and Food Chemistry, 2, 629 (1954)). The analysis showed that the solution contained 0.648 mg. of total pyrethrum per ml., which in terms of the dry weight of the flowers extracted, represents 1.98%.

EXAMPLE II

An amount of 17.0 gms. of coarsely divided fresh pyrethrum flowers, having a moisture content of 75.5%, was placed in a glass cylinder, 4 cm. in diameter by 10 cm. in height. The cylinder with the flowers was placed inside a constant-temperature oven, regulated to exactly 40° C. A mixed solvent composed of normal-hexane (85 percent by volume) and acetone (15 percent by volume) was added to cover the flowers. By means of a stopcock attached to the lower end of the cylinder, the solvent was allowed to percolate at an approximate rate of 1 ml. per minute, with sufficient fresh solvent being added all the time to keep the flowers covered with solvent. A total volume of 270 ml. of extract was collected. Only very small quantities of aqueous phase (less than 1 ml.) were found in this extract. An aliquot of this extract was analyzed for total pyrethrins by the "sulfur-color" method, indicating that a total of 92.5 mg. of pyrethrins were present in the extract. On the basis of the dry weight of the flowers used for this experiment, the amount of pyrethrins recovered corresponds to an extraction of 2.20% of pyrethrins.

It is understood that mixtures of several water-miscible or water-immiscible solvents can be substituted for the single solvent utilized in the foregoing examples with similar results.

Intensive research over a long period of years has failed to find a chemical method of analysis for pyrethrum which provides an exact and dependable measure of biological activity. Therefore it has been necessary to develop and employ biological procedures to check the chemical analyses and to make sure that the extract measures up to a standard.

In the United States the best known and most widely employed of these is the Peet Grady method or modifications thereof by which the biological activity is measured under controlled conditions against specially reared houseflies. The standard used for comparison is the Official Test Insecticide (OTI). This is made from conventional extracts and is standardized to contain 100 mg. of pyrethrins per 100 ml. as determined by the official method of analysis, Association of Official Analytical Chemists, eighth edition. The OTI is made and distributed under the supervision of the Chemical Specialties Manufacturers Association.

Under the test conditions the OTI will give approximately 95% knockdown in ten minutes and a twenty-four hour kill of 50% or less, preferably less. The concentration of the OTI is selected to give a twenty-four hour kill of 50% or less in order to permit a more accurate comparison with the test sample used at the same concentration. The extract under examination, also diluted to 100 mg. of pyrethrins per 100 ml. on the basis of chemical analysis, is accepted as up to standard if the results obtained with it approximate those obtained with the OTI. If the results obtained fall more than 5% below those obtained with the OTI the extract under test is regarded as substandard.

Pyrethrum extracts made by the process of Examples I and II, when standardized by chemical analysis and tested by the above method, consistently give exceptionally high results demonstrating that they have a superior biological value significantly higher than conventional extracts of supposedly equal pyrethrin content.

Comparative tests of biological activity of three separate extracts prepared according to the process of the invention with the Official Test Insecticide according to the Peet Grady, large group, method (Soap and Chemical Specialties Blue Book, 1957, pages 225–226 and 269–270) are shown in Table III.

TABLE III

| Test No. | Sample | Percent Knockdown | | | Percent Mortality, 24 hours |
|---|---|---|---|---|---|
| | | 3' | 5' | 10' | |
| 1 | OTI | 95.4 | 96.9 | 98.7 | 31.4 |
| | Extract INEXA 118 produced according to Example II. | 95.6 | 97.7 | 99.0 | 59.2 |
| 2 | OTI | 88.4 | 92.1 | 95.2 | 38.1 |
| | Extract 5060 produced according to Example I. | 88.5 | 91.2 | 94.5 | 46.3 |
| 3 | OTI | 90.3 | 92.6 | 95.1 | 42.5 |
| | Extract NR 777 produced according to Example II. | 91.8 | 94.3 | 97.1 | 57.5 |

This last extract (NR 777) was also compared with that of the Standard Kenya extract (ECX. 18a) on adult female houseflies using a measured drop technique (topical method) as described by Lichfield et al., J. Pharmacol., vol. 96, page 99 (1949) and Murray, Soap, vol. 16(6), page 11 (1940). According to this method duplicate tests are run where varying dosages of the standard and the unknown pyrethrum extracts are applied topically to a number of adult female houseflies, Musca domestica, L., and the percent mortality is determined for each dosage. The median lethal dose (LD 50) is then determined and the efficiency as compared to the standard is also determined.

The standard pyrethrum extract and the unknown are compared on a comparable pyrethrins basis as determined by chemical analysis. The various doses are made up by diluting the extracts containing 100 mg./100 ml. of pyrethrins with A.R. (Analytical Reagent) acetone.

Table IV gives the mortalities, expressed as percentages, for the relevant doses in three series of comparisons where the control mortality did not exceed 10%.

TABLE IV

| Experiment No. | Dose in mg./ml. | Mortality, percent | Corrected, percent | LD 50 in mg./ml. | Efficiency |
|---|---|---|---|---|---|
| 1 Standard (ECX. 18a). | Control | 2.9 | | 0.049±0.006 | 100 |
| | 0.15 | 97.8 | 97.8 | | |
| | 0.09 | 88.9 | 88.7 | | |
| | 0.054 | 66.7 | 66.4 | | |
| | 0.0324 | 24.4 | 23.6 | | |
| | 0.0194 | 4.4 | 3.4 | | |
| 1 Unknown (NR777). | 0.157 | 97.7 | 97.6 | 0.030±0.005 | 163.3 |
| | 0.095 | 95.6 | 95.5 | | |
| | 0.057 | 93.5 | 93.3 | | |
| | 0.034 | 64.9 | 63.8 | | |
| | 0.020 | 20.5 | 18.1 | | |
| 2 Standard | Control | 9.1 | | 0.052±0.006 | 100 |
| | 0.15 | 95.6 | 95.2 | | |
| | 0.09 | 90.9 | 90.0 | | |
| | 0.054 | 51.1 | 46.2 | | |
| | 0.0324 | 25.6 | 18.2 | | |
| | 0.0194 | 9.5 | 4.4 | | |
| 2 Unknown | 0.157 | 97.5 | 97.2 | 0.044±0.007 | 118.2 |
| | 0.095 | 94.9 | 94.4 | | |
| | 0.057 | 75.0 | 72.5 | | |
| | 0.034 | 35.7 | 29.3 | | |
| | 0.020 | 13.6 | 5.0 | | |
| 3 Standard | Control | 9.1 | | 0.031±0.004 | 100 |
| | 0.075 | 97.7 | 97.5 | | |
| | 0.056 | 93.3 | 92.6 | | |
| | 0.042 | 81.4 | 79.5 | | |
| | 0.0325 | 52.2 | 47.4 | | |
| | 0.0240 | 42.9 | 37.2 | | |
| 3 Unknown | 0.079 | 97.6 | 97.4 | 0.028±0.004 | 110.7 |
| | 0.0587 | 93.2 | 92.5 | | |
| | 0.0440 | 80.5 | 78.5 | | |
| | 0.0330 | 81.0 | 79.1 | | |
| | 0.0252 | 48.8 | 43.7 | | |

In Experiment 1 there was a lapse of 5 days between testing the Standard and the Unknown and the flies used in the bio-assay of the Unknown were smaller than those normally used.

Experiments 2 and 3 were carried out at the same time, and the bio-assays of the Standard and Unknown were, in each case, concurrent.

The measured drop technique utilized above is considered by some entomologists to be a more accurate method of determining the relative biological activity of pyrethrum extracts than either the Peet-Grady or Kearns and March methods.

The above tests are cited only as examples to illustrate the unique character of extracts made by the process of the invention and their superiority over conventional extracts. No claim as to the exact degree of this superiority is implied, nor is there any election made among the numerous hypothetical explanations which might be adduced to account for the observed superiority.

In addition to the superiority of biological activity of pyrethrum extracts prepared according to my invention, the insecticidal pyrethrum extract of from 15% to 35% concentration in terms of pyrethrins content prepared according to my invention can be distinguished from similar concentrates of conventional pyrethrum extracts by appearance, by behaviour on dilution with hydrocarbon oils, and by comparison of ultraviolet and infrared spectra.

It should be made clear that the usefulness of this mixed solvent procedure is not limited to fresh flowers having a moisture content of 30% or more. Dried flowers can be extracted in the same way. However, the advantages of the procedure diminish both because drying reduces the pyrethrin content and biological activity and because the advantages of the water phase mechanism described in the foregoing diminish as the water content is reduced below 30%.

I claim:

1. An improved method of recovering biologically-active pyrethrin substances from fresh pyrethrum flowers, said flowers containing at least 30% moisture, which comprises coarsely dividing said fresh pyrethrum flowers, contacting said divided flowers with an excess of a mixed extraction solvent at temperatures below 60° C., said mixed solvent consisting of about 5% to about 35% by volume of a water-miscible, hydrocarbon-miscible solvent selected from the group consisting of acetone and dioxane and about 95% to about 65% by volume of a water-immiscible alkane hydrocarbon solvent relatively free from naphthenic constituents and unsaturated hydrocarbons for about 6 to about 28 hours to extract said biologically-active pyrethrin substances while extracting substantially none of said moisture from said flowers, separating said mixed solvent from the exhausted flowers, evaporating said mixed solvent at temperatures below 60° C. and recovering biologically-active pyrethrin substances.

2. The process of claim 1 wherein said water-immiscible alkane hydrocarbon solvent is selected from the group consisting of petroleum ether, hexane, heptane, solvent naphtha and kerosene.

3. An improved method of recovering biologically-active pyrethrin substances from fresh pyrethrum flowers having a moisture content of at least 30%, which comprises coarsely dividing fresh pyrethrum flowers, contacting said divided flowers with an excess of a mixed extraction solvent consisting of about 15% acetone by volume and about 85% petroleum ether by volume at temperatures below 60° C. for about 6 to about 28 hours to extract said biologically-active pyrethrin substances while extracting substantially none of said moisture from said flowers, separating said mixed solvent from the exhausted flowers, evaporating said mixed solvent at temperatures below 60° C. and recovering biologically-active pyrethrin substances.

4. An improved method of recovering biologically-active pyrethrin substances from fresh pyrethrum flowers, said flowers containing above about 68.7% moisture, which comprises coarsely dividing said fresh pyrethrum flowers, contacting said divided flowers with an excess of a mixed extraction solvent at temperatures below 60° C., said mixed solvent consisting of about 5% to about 35% by volume of a water-miscible, hydrocarbon-miscible solvent selected from the group consisting of acetone and dioxane and about 95% to about 65% by volume of a water-immiscible alkane hydrocarbon solvent relatively free from naphthenic constituents and unsaturated hydrocarbons for about 6 to about 28 hours to extract said biologically-active pyrethrin substances while extracting substantially none of said moisture from said flowers, separating said mixed solvent from the exhausted flowers, evaporating said mixed solvent at temperatures below 60° C. and recovering biologically-active pyrethrin substances.

5. An improved method of recovering biologically-active pyrethrin substances from fresh pyrethrum flowers, said flowers containing above about 68.7% moisture, which comprises coasely dividing fresh, undried pyrethrum flowers, contacting said divided flowers with an excess of a mixed extraction solvent consisting of about 15% acetone by volume and about 85% petroleum ether by volume at temperatures below 60° C. for about 6 to about 28 hours to extract said biologically-active pyrethrin substances while extracting substantially none of said moisture from said flowers, separating said mixed solvent from the exhausted flowers, evaporating said mixed solvent at temperatures below 60° C. and recovering biologically-active pyrethrin substances.

6. The product produced by the process of claim 1, which, when standardized to contain 100 mg. of pyrethrins per 100 ml., shows biological activity superior to Official Test Insecticide of the same concentration.

7. An insecticidal pyrethrum extract having superior biological powers produced according to the process of claim 3 by coarsely dividing fresh pyrethrum flowers having a moisture content of at least 30%, contacting said divided flowers with an excess of a mixed extraction solvent consisting of about 15% acetone by volume and about 85% petroleum ether by volume at temperatures below 60° C. for about 6 to about 28 hours to extract the biologically-active pyrethrin substances while extracting substantially none of said moisture from said flowers, separating said mixed solvent from the exhausted flowers, evaporating said mixed solvent at a temperature below 60° C. and recovering an insecticidal pyrethrum extract which when standardized to contain 100 mg. of pyrethrins per 100 ml. shows biological activity superior to Official Test Insecticide of the same concentration.

References Cited in the file of this patent

UNITED STATES PATENTS

| | | |
|---|---|---|
| 458,908 | Leonardi | Sept. 1, 1891 |
| 1,595,538 | Yamamoto | Aug. 10, 1926 |

FOREIGN PATENTS

| | | |
|---|---|---|
| 559,735 | Great Britain | Mar. 2, 1944 |